United States Patent [19]

Morimoto et al.

[11] 4,399,853
[45] Aug. 23, 1983

[54] METAL CORD-RUBBER COMPOSITE MATERIALS

[75] Inventors: Masaaki Morimoto, Sakato; Noboru Kusakabe, Ohme; Koichi Kojima; Eiichi Koyama, both of Higashimurayama, all of Japan

[73] Assignee: Bridgestone Tire Co., Ltd., Tokyo, Japan

[21] Appl. No.: 289,647

[22] Filed: Aug. 3, 1981

[30] Foreign Application Priority Data

Aug. 11, 1980 [JP] Japan ................................. 55-109135

[51] Int. Cl.³ .......................... B60C 9/18; D02G 3/00
[52] U.S. Cl. ................................. 152/359; 152/361 R; 57/204; 57/208; 57/226; 57/228; 57/902; 428/295; 428/390; 428/399; 428/461; 428/465
[58] Field of Search ....................... 152/359, 361, 356; 57/204-208, 226-228, 902; 156/110 C; 428/295, 390, 397, 399, 461, 462, 465-466

[56] References Cited

U.S. PATENT DOCUMENTS 4,258,543  3/1981  Canevari et al. ................. 152/359
4,333,306  6/1982  Yamashita et al. ............... 152/359

OTHER PUBLICATIONS

Research Disclosure No. 17015, Jun. 1978, disclosed anonymously.

Primary Examiner—Edward C. Kimlin
Assistant Examiner—Lois E. Boland
Attorney, Agent, or Firm—Sughrue, Mion, Zinn, Macpeak & Seas

[57] ABSTRACT

A composite material of rubber and metal cords embedded therein is disclosed. The metal cord is produced by twisting at least three metal filaments, and has an elongation under a load of 5.0 kg/cord ($P_1$) of 0.2–1.2% and an elongation under a load of 2.0 kg/cord ($P_2$, %) of $P_2 \leq 0.947 P_1 - 0.043$ prior to the embedding in rubber.

8 Claims, 4 Drawing Figures

(1x5)   (1x4)   (1x3)

(1x5)   (1x4)   (1x3)

(1×5)

A    B    C    C'

D    D'    E (1×4)

A    B    C    C'    D (1×3)

A    B    C

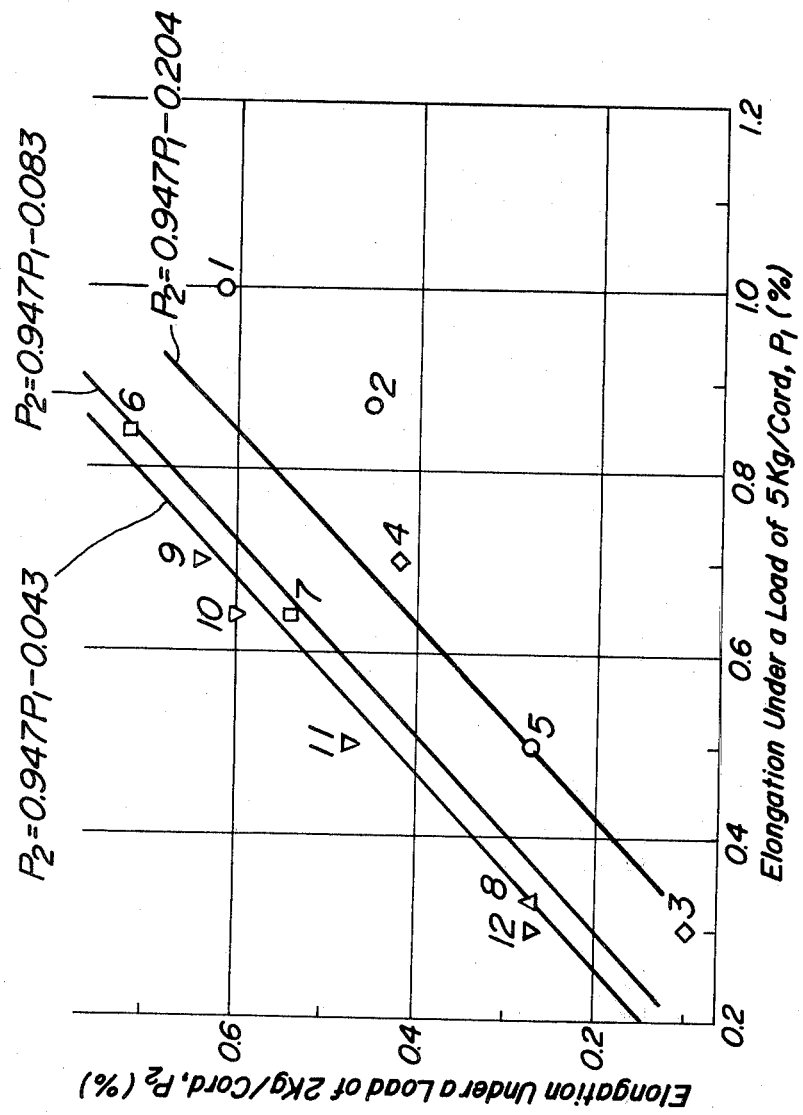

METAL CORD-RUBBER COMPOSITE MATERIALS

This invention relates to composite materials of metal cords as a reinforcement and rubber, and more particularly to metal cord-rubber composite materials having an improved corrosion resistance for metal cord and a prolonged use life by using metal cords of a novel twisting construction.

The composite materials of metal cords and rubber are particularly used as a belt reinforcement in steel radial tires. In this case, steel cords of so-called 1×4 or 1×5 strand construction, produced by twisting 4 or 5 steel filaments, are presently widely used as a belt reinforcement. As shown in section in FIG. 1, however, such a metal cord includes a cavity extending in its central part toward the longitudinal direction.

When the steel cords of the above described construction are used in the belt reinforcement, if the tire is subjected to an external injury such that sharp pebble, nail or the like reaches into the metal cord during running on a road, water or the like penetrates through the injury and easily spreads into the cavity in the central part of the cord. Consequently the cord is corroded to cause deterioration of adhesion between cord and rubber, which produces a so-called separation phenomenon between cord and rubber.

Figure 1:
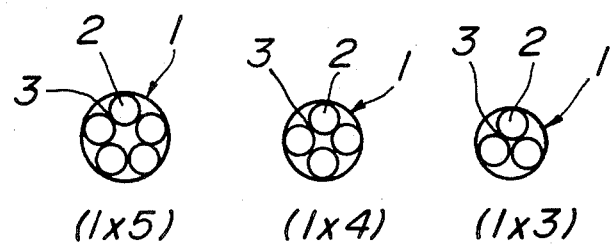
Figure 2:
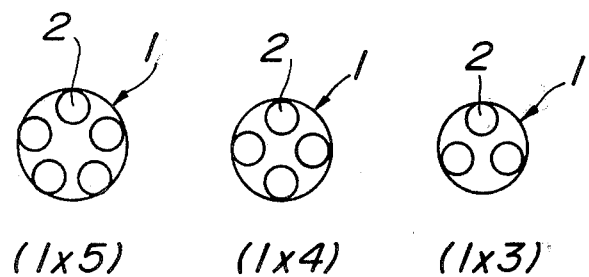

Therefore, various attempts have hitherto been made in order to improve the above drawback. Particularly, cords as shown in FIG. 2 have been proposed in U.S. Pat. No. 4,258,543, wherein several filaments are twisted at a slightly large cord diameter without contacting them with each other so as to form a space between adjacent filaments and uniformly inscribed with a circle of cord section as compared with the conventional cords having a most compact cord diameter with no space between adjacent filaments as shown in FIG. 1. In such cords, the corrosion resistance for the metal cord is considered to be improved because when the cords are embedded in rubber and then subjected to a hot curing step, the rubber penetrates into the cavity in the central part of the cord through spaces between adjacent filaments owing to its fluid state at an initial curing stage so as not to disperse water penetrated from the external injury into the cord.

However, it has been confirmed from experiments and experience that the cords disclosed in the above patent specification have the following drawbacks. That is, since the hot curing step is usually carried out at a pressure of 4–40 kg/cm$^2$, the swelling of the cord is broken down by the above pressure to substantially eliminate the space between adjacent filaments. As a result, the fluidized rubber hardly penetrates into the cavity in the central part of the cord or if penetrated, only a slight amount of the rubber locally penetrates into the cord. Therefore, when a product containing such cords therein is subjected to an external injury, an interface between the locally penetrated rubber and the cord is corroded by water penetrating from the injury in a short time and also water further spreads in a longitudinal direction of the cord through such a corroded interface. Consequently, a separation failure results between the cord and the rubber.

Under the above circumstances, the inventors have made various studies and found out that the above mentioned drawbacks may be solved by embedding metal cords of a quite new concept in rubber, and as a result the invention has been accomplished.

According to the invention, there is provided a composite material of rubber and metal cords embedded therein, characterized in that said metal cord is produced by twisting at least three metal filaments, preferably four to five metal filaments, and has an elongation under a load of 5.0 kg/cord ($P_1$) of 0.2–1.2% and an elongation under a load of 2.0 kg/cord ($P_2$) of $P_2(\%) \leq 0.947 P_1 - 0.043$ prior to the embedding in rubber.

Figure 3:
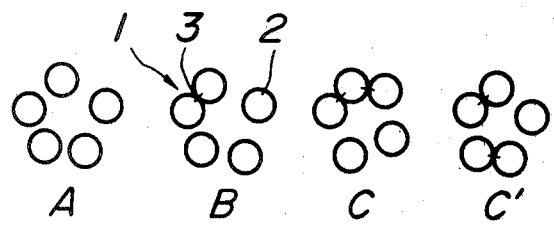
Figure 3:
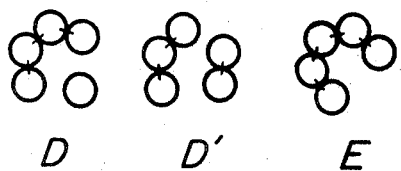
Figure 3:
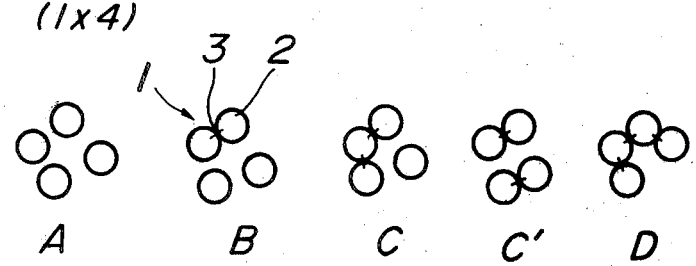
Figure 3:
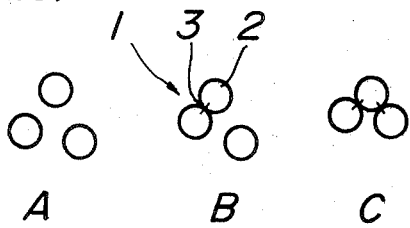

The invention will now be described with reference to the accompanying drawings, wherein:

FIG. 1 is a diagrammatically sectional view of conventional compact-type metal cords as mentioned above;

FIG. 2 is a diagrammatically sectional view of metal cords as disclosed in U.S. Pat. No. 4,258,543;

FIG. 3 is a diagrammatically sectional view of metal cords according to the invention; and FIG. 4 is a graph showing a relationship between the elongations $P_1$, $P_2$ of the metal cord and the rubber penetration degree.

As shown in FIG. 3, the metal cord 1 to be used in the invention is produced by twisting at least three metal filaments 2, and includes at least three kinds of sectional shapes in its longitudinal directions except the case of contacting all of the filaments with each other. That is, in order to obtain metal cords having various sectional shapes, the metal cord according to the invention is necessary to have an elongation under a load of 5.0 kg/cord ($P_1$) of 0.2–1.2% and an elongation under a load of 2.0 kg/cord ($P_2$, %) of not more than $0.947 P_1 - 0.043$, preferably not more than $0.947 P_1 - 0.083$, more particularly not more than $0.947 P_1 - 0.204$. When the elongation $P_1$ is less than 0.2%, the object of the invention cannot be achieved because there is no great difference between the cord and the conventional compact-type cord, while when the elongation $P_1$ exceeds 1.2%, the cord is apt to produce twist disturbance at its cut end and workability comes into question. Moreover, the elongation $P_1$ is preferably within a range of 0.2–0.7% in view of the workability but within a range of 0.7–1.2% in view of rubber penetrating property. On the other hand, even if the elongation $P_1$ is within the above defined range, when the elongation $P_2$ exceeds $0.947 P_1 - 0.043$, there is increased the sectional shape of the cord being apt to be broken down under a curing pressure at the hot curing step after the embedding in rubber, i.e. the uniformly swollen sectional shape as disclosed in the above mentioned patent specification and consequently rubber is hardly penetrated into the inside of the cord.

Next, the elongation $P_2$ will be described in detail in connection with the penetrating property of rubber into the cord.

In open-twisted cords, each filament constituting the cords usually tends to contract toward the center of the cord when a tensile stress is applied to the cord. In this case, even when the elongation $P_1$ is constant, the elongation $P_2$ may be large or small.

The large elongation $P_2$ corresponds to such a case that the sectional shape of the cord is uniform in the longitudinal direction (or space between adjacent filaments is uniform) as shown in FIG. 2. Therefore, each filament constituting the cord tends to freely move toward the center of the cord, so that the elongation under a load of 2 kg/cord is relatively high.

On the other hand, the small elongation $P_2$ corresponds to such a case that the sectional shape of the cord is non-uniform as shown, for example, in $(1\times5)$, B–E of FIG. 3 and the filaments constituting the cord partly but not wholly contact with each other. In this case, even if each filament tends to move toward the center of the cord, the contact pressure (or rebound force) acts on the adjacent contacted filaments, so that the elongation under a load of 2 kg/cord becomes lower.

When the number of contact points shown as point 3 between adjacent filaments in the sectional shape of the cord as shown in FIG. 3 is defined as a contact member, if the elongation $P_1$ is constant, the non-uniformity of the sectional shape of the cord is represented by the contact number. That is, the larger the contact number, the more the non-uniformity of the sectional shape.

In the single twisting construction, the non-uniformity of the sectional shape of the cord is a maximum when the contact number in the cord composed of five filaments is 4 ($1\times5$, E of FIG. 3) or when the contact number in the cord composed of four filaments is 3 ($1\times4$, D of FIG. 3). As a result, the space between adjacent non-contacting filaments is a maximum and also the cord does not significantly break down at the hot curing step, so that the space required for the penetration of rubber is maintained in the cord.

In the metal cord according to the invention, it is preferable that the twisting pitch of the metal filament is 3–16 mm. When the twisting pitch is less than 3 mm, the productivity in the cord production is considerably low and the commercial value is practically poor. When the twisting pitch exceeds 16 mm, the folding endurance of the cord at buckling fatigue considerably reduces. Moreover, the twisting pitch of not less than 8 mm is preferable in view of productivity, so that the range of the twisting pitch of 8–16 mm is practically optimum.

Further, each metal filament constituting the metal cord according to the invention is preferable to have a diameter of 0.12–0.4 mm. Because, when the diameter is less than 0.12 mm, the strength is too small, while when the diameter exceeds 0.4 mm, the fatigue resistance lowers to a practically unsuitable extent. Moreover, the kind of the metal cord to be used is not restricted, but steel cords are preferable in view of commercial availability and inexpensiveness. In the latter case, steel filaments constituting the cord may be coated with a metal such as Cu, Sn, Zn and the like or an alloy thereof containing Ni, Co and the like in order to improve the adhesion of the filament to rubber.

The metal cords to be used in the invention may be manufactured as follows. That is, the metal cord is manufactured by twisting a given number of previously excessively worked filaments and then compressing them in the radial direction of the resulting cord to obtain a given elongation $P_1$ (under a load of 5 kg/cord). By way of an example, the cords of Run No. 2 in the following Table 1 are obtained by twisting five worked steel filaments each having a value $P_1$ of 1.8% through the usual twisting machine and then compressing them to a value $P_1$ of 0.87% through rollers.

According to the invention, natural or synthetic rubber is used as a coating rubber embedding the metal cords therein. Particularly, when the metal cord-rubber composite material according to the invention is used, for example, as a belt reinforcement in radial tires, it is favorable that 50% modulus of the coating rubber is within a range of 10–40 kg/cm$^2$. When the 50% modulus is less than 10 kg/cm$^2$, the strain produced in the end portion of the metal cord becomes larger and the resistance to the belt end separation (crack growth of belt coating rubber from cord end of belt) deteriorates. While, when the 50% modulus exceeds 40 kg/cm$^2$, the durability of the belt is apt to deteriorate or cord folding is apt to occur and at the same time the workability lowers considerably.

In the metal cord-rubber composite material of the above structure according to the invention, rubber thoroughly penetrates into the cord in both the longitudinal and sectional directions, so that the diffusion of rust on the surface of the metal cord resulting from the penetration of water through external injuries is prevented. Therefore, the separation phenomenon due to the reduction of adhesion between the metal cord and the rubber resulting from the corrosion of the cord is largely improved, and hence the use life of the composite material according to the invention is considerably improved. As a result, the composite material according to the invention not only develops excellent effect in use for tires, but also may widely be used in industrial goods such as agricultural tillers, belts and the like.

Moreover, the invention is applicable to bundle-twisted cords such as 2+7, 3+6, 3+9, 4+10, 3+9+15 and other constructions or strand construction cords such as 7×3, 7×4 and other constructions.

The following examples are given in illustration of the invention and are not intended as limitations thereof.

EXAMPLE 1

Twelve kinds of metal cords shown in the following Table 1 were prepared by twisting at least three steel filaments, each being plated with brass, at a twisting pitch of 9.5 mm. Each of these metal filaments was embedded in rubber having a 50% modulus of 25 kg/cm$^2$ as a coating rubber for a belt of a tire and then cured to form a composite material. After the metal cord was taken out from the composite material, a length of that portion containing rubber almost completely penetrated into the central part of the cord was measured and then the rubber penetration degree was evaluated by an index as a ratio of the penetration degree per the full length of the cord. For the comparison, similar evaluation was made with respect to the conventional metal cord as shown in FIG. 1. The measured results are also shown in Table 1. Here, $P_1$ and $P_2$ are elongations (%) under loads of 5.0 kg and 2.0 kg per the metal cord having a full length of 20–50 cm, respectively, and the sectional shape is indicated by symbols shown in FIG. 3 as a result of observing the section of the cord at an interval of 5 mm in its longitudinal direction by a magnifying glass.

TABLE 1

| Run No. | Kind of cord | $P_1$ (%) | $P_2$ (%) | Sectional shape | Rubber penetration degree | Cord corroded length |
|---|---|---|---|---|---|---|
| 1 | (1 × 5) × 0.25 | 1.00 | 0.62 | ABCC'DD'E | 100 | 5 |
| 2 | (1 × 5) × 0.25 | 0.87 | 0.45 | " | 95 | 5 |
| 3 | (1 × 5) × 0.25 | 0.30 | 0.10 | " | 65 | 10 |

TABLE 1-continued

| Run No. | Kind of cord | $P_1$ (%) | $P_2$ (%) | Sectional shape | Rubber penetration degree | Cord corroded length |
| --- | --- | --- | --- | --- | --- | --- |
| 4 | (1 × 4) × 0.25 | 0.70 | 0.42 | ABCC'D | 70 | 10 |
| 5 | (1 × 3) × 0.25 | 0.50 | 0.27 | ABC | 80 | 7 |
| 6 | (1 × 5) × 0.25 | 0.84 | 0.72 | ABCC' | 55 | 15 |
| 7 | (1 × 4) × 0.25 | 0.64 | 0.54 | ABCC' | 50 | 20 |
| 8 | (1 × 3) × 0.25 | 0.33 | 0.27 | ABC | 25 | 40 |
| 9 | (1 × 4) × 0.25 | 0.70 | 0.64 | AB | 15 | 95 |
| 10 | (1 × 4) × 0.25 | 0.64 | 0.60 | " | 10 | 98 |
| 11 | (1 × 3) × 0.25 | 0.50 | 0.47 | " | 5 | 100 |
| 12 | (1 × 5) × 0.25 | 0.30 | 0.27 | " | 0 | 100 |
| 13 | (1 × 5) × 0.25 | (0.14) | (0.06) | FIG. 1 | 0 | 100 |

In the cords of Run Nos. 1-12 as shown in Table 1, the rubber penetration degree is plotted in FIG. 4 by symbols o (80-100), ◊ (60-79), □ (40-59), Δ (20-39) and ∇ (0-19) as a relationship to $P_1$ (abscissa) and $P_2$ (ordinate).

As apparent from Table 1 and FIG. 4, the metal cords of Run Nos. 1-8 (preferably Run Nos. 1-6) with a range of $P_2 \leq 0.947 P_1 - 0.043$ (preferably $P_2 \leq 0.947 P_1 - 0.083$) have the rubber penetration degree of not less than 25 (preferably not less than 55) and show that the rubber well penetrates into the inside of the metal cord. On the other hand, the metal cords of Run Nos. 9-12 with a range of $P_2 > 0.947 P_1 - 0.043$ are substantially the same as the cord having a uniform swollen sectional shape, wherein filaments constituting the cord are not contacted with each other, and are poor in the rubber penetration degree.

Next, pneumatic tires having a tire size of 175 SR 14 were manufactured by using the metal cords of Run Nos. 1-12 shown in Table 1 as a reinforcement for a belt layer (50% modulus of coating rubber: 25 kg/cm²). In a ground contact area of each tire was pierced a hole of 3 mm diameter so as to extend to the metal cord. After these tires were run on a general road over a distance of 50,000 km, the metal cord was taken out from the tire at a position corresponding to the position of the hole, and then how far the adhered boundary between the cord and the coating rubber deteriorated was estimated as a cord corroded length and indicated by an index on the basis that the cord corroded length of the metal cord of Run No. 13 is 100. The measured results are also shown in Table 1, wherein the smaller the index value, the better the corrosion resistance of the cord. From the data of Table 1, it is apparent that in the tires using the metal cords of Run Nos. 1-8 according to the invention, the corrosion resistance of the metal cord is improved and particularly the improvement of corrosion resistance is conspicuous in the tires of Run Nos. 1-6 and hence the use life of the tire is largely prolonged.

EXAMPLE 2

The same evaluation as described in Example 1 was repeated by embedding the metal cord according to the invention having $P_1$ of 0.70%, $P_2$ of 0.52% and sectional shapes of A, B, C, C', D, D', E, which was composed of 5 brass-plated steel filaments of 0.25 mm diameter, in a coating rubber having a 50% modulus of 10-40 kg/cm². The measured results are shown in the following Table 2.

TABLE 2

| run No. | 50% modulus of rubber (kg/cm²) | Kind of cord | $P_1$ (%) | $P_2$ (%) | Sectional shape | Rubber penetration degree | Cord corroded length |
| --- | --- | --- | --- | --- | --- | --- | --- |
| 14 | 10 | (1 × 5) × 0.25 | 0.70 | 0.52 | ABCC'DD'E | 95 | 5 |
| 15 | 20 | " | " | " | " | " | 5 |
| 16 | 30 | " | " | " | " | " | 5 |
| 17 | 40 | " | " | " | " | " | 5 |

As apparent from Table 2, the object of the invention can be achieved without being influenced by the change of 50% modulus so far as the 50% modulus of the coating rubber is within a defined range.

EXAMPLE 3

The same metal cord as described in Example 2 was used as a reinforcement in a rubber crawler for an agricultural tiller. As a result of the running test over an year, it has been confirmed that the corrosion resistance of the metal cord according to the invention is considerably improved.

What is claimed is:

1. A composite material of rubber and metal cords embedded therein, characterized in that said metal cord is produced by twisting at least three metal filaments, and has an elongation under a load of 5.0 kg/cord ($P_1$) of 0.2-1.2% and an elongation under a load of 2.0 kg/cord ($P_2$) of $P_2(\%) \leq 0.947 P_1 - 0.043$ prior to the embedding in rubber.

2. A composite material according to claim 1, wherein said metal cord includes at least three kinds of sectional shapes except the case of contacting all of said metal filaments with each other in the longitudinal direction of said cord.

3. A composite material according to claim 1, wherein said metal cord has an elongation $P_2$ (%) of $P_2 \leq 0.947 P_1 - 0.083$.

4. A composite material according to claim 1, wherein said metal filament is twisted at a twisting pitch of 3-16 mm.

5. A composite material according to claim 1, wherein said metal filament has a diameter of 0.12-0.4 mm.

6. A composite material according to claim 1, wherein said rubber for embedding said metal cord has a 50% modulus of 10-40 kg/cm².

7. A composite material according to claim 1, wherein the kind of said metal cord is (1×5)×0.25.

8. A pneumatic tire having metal cords as a reinforcement for a belt layer, characterized in that said metal cord is produced by twisting four or five metal filaments, and has an elongation under a load of 5.0 kg/cord ($P_1$) of 0.2–1.2% and an elongation under a load of 2.0 kg/cord ($P_2$) of $P_2(\%) \leq 0.947 P_1 - 0.043$ prior to the embedding in rubber having a 50% modulus of 10–40 kg/cm$^2$.

* * * * *